Nov. 19, 1929.  B. C. S. JENSEN ET AL  1,736,534
TIRE DEFLATION SWITCH
Filed Jan. 20, 1927

Börge C. Skovgaard Jensen
Jens P. Petersen. Inventors
by Ivan E. A. Königsberg
Attorney Patented Nov. 19, 1929

1,736,534

UNITED STATES PATENT OFFICE

BORGE CHRISTIAN SKOVGAARD JENSEN, OF FREDERIKSBERG, AND JENS PETER PETERSEN, OF COPENHAGEN, DENMARK

TIRE-DEFLATION SWITCH

Application filed January 20, 1927, Serial No. 162,335, and in Denmark January 26, 1926.

The present invention relates to a device which, in a reliable and clear manner will indicate to the driver when the pressure in the pneumatics of an automobile sinks below a given, previously determined limit. The device may be constructed in such a manner that a certain common signal is given when the pressure in one of the pneumatics sinks below a given limit, or it may be so constructed that a separate signal is given for each of the automobile's four wheels, so that the driver will at once know which of the wheels has lost air.

In the accompanying drawing two constructional forms of the invention are shown.

Figure 1:
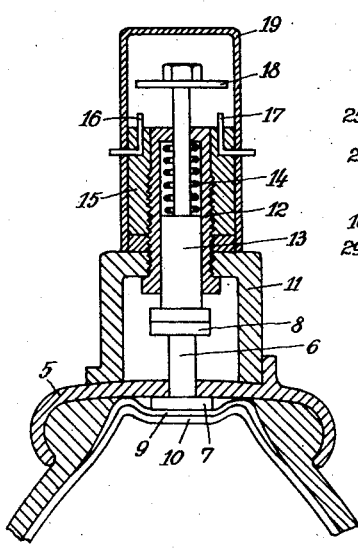
Fig. 1 is a section through an automatic contact arrangement disposed in connection with the pneumatic of an automobile wheel.

As shown in Fig. 1 a pin 6 is disposed in a hole in the detachable rim 5 of an automobile wheel. This pin 6 has at each end a disc shaped flange 7 and 8, respectively. The flange 7 is by means of a piece of canvas 9 separated from the pneumatic 10 of the wheel tire, which pneumatic lies in known manner within the cover of the tire.

To the permanent rim 11 of the automobile wheel is attached a tubular casing 12, in which is journalled a pin 13 which by means of a spring 14 is forced inwards against the flange 8 of pin 6. Around this tubular casing 12 is disposed a sleeve 15 which is made of an insulating material in which are fitted two contact pins, 16 and 17, respectively. To the end of pin 13 is secured a disc 18, and the whole contact arrangement is enclosed by a cap 19.

The pressure of the air in the pneumatic 10 will act on the flange 7 of the pin 6, and when the pneumatic is sufficiently inflated this pressure will exceed that of the spring 14, and the several parts will be in the positions shown in Fig. 1. If, now, the pressure in the pneumatic 10 should drop the pressure of the spring 14 will cause the pin 6 with its flange 7 to be pressed inwards through the hole in the rim 5, until the spring 14, the tension of which is thereby reduced is balanced by the pressure of the pneumatic 10 against the flange 7. If the pressure of the air within the pneumatic falls below a given limit the disc 18 will touch the contact pins 16 and 17 and thereby close an electric circuit which will produce some kind of signal.

Figure 2:
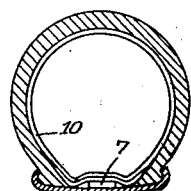
Fig. 2 shows the coupling of the respective wheel with the underframe of the automobile.
Figure 2:
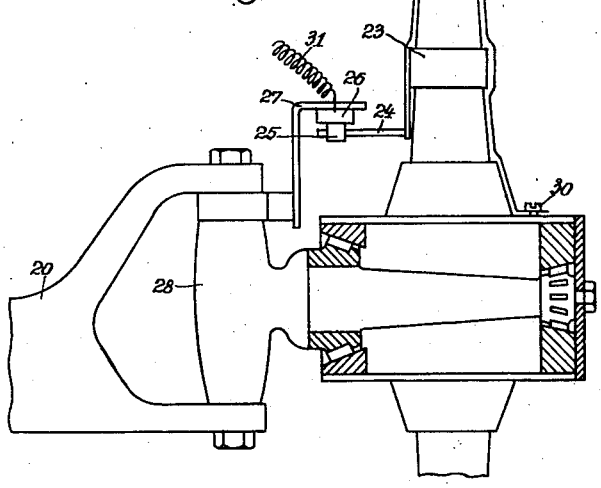

In Fig. 2 is shown the front axle 20 of the automobile to which a front wheel is fitted in known manner. The apparatus shown in Fig. 1 is also drawn in this figure, and the contact pin 17 is by means of an electric lead 21 connected with a fitting 23 secured to one of the wheel's spokes 22. This fitting carries a pin 24 with a roller 25 which at each revolution of the wheel will touch a contact bar 26. This bar is secured to an angle 27 screwed to the knuckle 28 holding the wheel. The contact pin 16 is by means of an electric lead connected to a screw 30 screwed into the iron part of the hub so that this lead is in conductive connection with the frame of the automobile. The bar 26 is by means of a lead 31 connected with a signal lamp on the instrument board and a battery, the other pole of which is conductively connected to the frame of the automobile.

Figure 4:
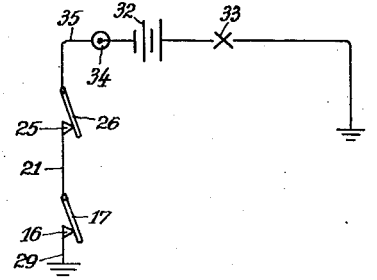
Fig. 4 is a diagram of connections.

Fig. 4 shows the respective diagram of connections. The one pole of a battery 32 is connected to a lamp 33 and to the frame of the car, and the latter is by means of a lead 29 connected to the contacts 16, 17 by means of lead 21 to the contacts 25, 26 and by means of lead 35 to a switch 34 and the battery 32. The lamp is fitted to the instrument board of the car and it will blink at each revolution of the respective wheel when the contacts 16, 17 are closed and the switch 34 is operative.

Figure 3:
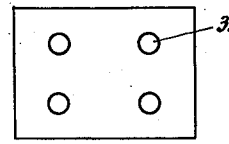
Fig. 3 is an arrangement of signals consisting of four electric lamps, disposed on the instrument board of the automobile.

As shown in Fig. 3 there may be arranged on the instrument board four lamps, one for each of the four wheels of the automobile. If then the one lamp blinks, it will be obvious which of the wheels has lost air. It will, however, often be sufficient to employ a single lamp only so that when this lamp blinks, the automobile is stopped and examined as to which of its four wheels has lost air.

The details shown in the drawing are diagrammatic only so as to render them more simple. It may thus, for instance, be added that the roller 25 really would have to be suspended elastically so as to obtain an absolutely safe contact with its bar 26.

Figure 5:
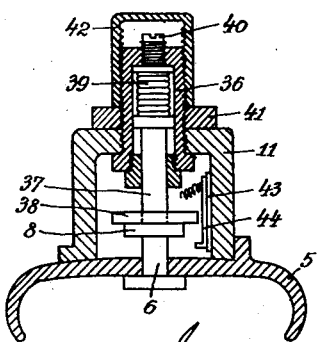
Fig. 5 is a section through a contact arrangement of another constructional form.

In the constructional form shown in Fig. 5 a socket 36 is fitted into the permanent rim 11. In this socket is disposed a sliding pin 37 which has below a disc flange 38 bearing against the above mentioned flange 8 on the pin 6. Above the pin 37 is disposed a spiral spring 39 the tension of which can be adjusted by aid of a screw 40 screwed into the top of the socket 36. The socket 36 is secured by means of a nut 41 to the permanent rim 11 and is covered above with a cap 42 which will prevent dust from entering into the parts of the mechanism.

Within the permanent rim 11 a contact member 44 is secured on an insulating plate 43. The lower end of this contact member is, as shown in the drawing bent over in such a manner that when the pin 37 is pressed downward by spring 39, the disc 38 will touch the contact member 44 whereby a conductive connection with the rim 11 is established.

Figure 6:
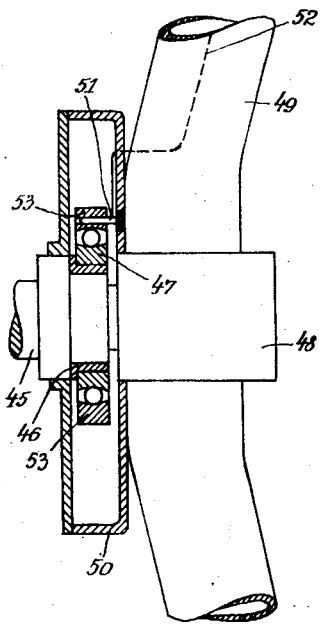
Fig. 6 shows the connection of this contact arrangement with a lead on the automobile by aid of a ball bearing.

In the constructional form shown in Fig. 6 an insulating ring 46 is fitted to the axle 45 of the automobile. This ring carries the inner ball race 47 of a ball bearing. 48 is the hub of the wheel carrying the spokes 49. To the hub 48 is secured a disc 50 which forms a wall in the brake housing and to this wall 50 is fitted insulatedly a contact pin 51 which by means of a lead carried upwards through one of the spokes 49 is connected with the contact member 44 shown in Fig. 5. The contact pin enters the outer ball race 53 through a hole, so that the same is in conductive connection with the said contact member 44. The inner ball race 47 is conductively connected with the respective lamp on the instrument board of the automobile.

When the air pressure in a pneumatic falls so far while driving that the spring 39 brings the disc 38 into contact with the member 44, a circuit will be closed through the lead 52, the two ball races 53 and 47 to the lamp on the instrument board of the car, the same as before. It has been found that by employing such ball bearing an absolutely reliable connection is obtained which otherwise might fail.

When the car is driving the ball race 53 will revolve together with the hub 48. When the automobile wheel is removed the pin 51 will go with the wheel whereas the race 53 will remain on the axle. When, therefore, the wheel is again being fitted, attention must be paid that the pin enters into the hole in the race 53.

It will be noted as a feature of the invention that there is no mechanical connection between the pins 6 and 13, nor between the pins 6 and 37. The two sets of pins are kept in pressure conducting contact by the springs 14 and 39 respectively. This is of importance both when mounting and dismounting the tire, as well as during the operation. It will be readily seen that when the tire is deflated or flat and must be demounted, the pin will move radially inwardly, hence offers no obstruction to the removal of the rim. When the tire is ready to be remounted it is done by an easy oblique sliding-on movement such as is now necessary in order to put the usual tire valve through its corresponding hole in the rim.

Again, in tightening the nuts which keep the tire on the wheel, there is a lateral sliding movement of the rim on the felly, which, however, does not impair the signal because the two sets of pins may slide laterally without disturbance.

The two forms of construction shown in Figures 1 and 5 both embody the same feature of having the circuit closing means carried by the outer stems 13 and 37 respectively.

The ball bearing means of conducting the current as shown in Figure 6 is preferred because it is not subject to wear or dirt or breakage whereby the circuit might become "unworkable."

Claim:

A pneumatic tire deflation indicator comprising a normally broken electric signalling circuit, a tire pressure controlled circuit closer for governing the point of break consisting of a housing, two contacts within said housing forming the terminals of the circuit closer, a pin in the housing, a member on said pin adapted to bridge the said two contacts, a second pin mounted in the rim of the wheel carrying the pneumatic tire and engaging the said first pin under the pressure of the tire to prevent said bridging member from contacting with the said two contacts, and a spring for moving said pin and bridging member into engagement with the said contacts to close the said circuit when the tire pressure falls below a predetermined limit.

The foregoing specification signed at Copenhagen, this 31st day of December, 1926.

BORGE CHRISTIAN SKOVGAARD JENSEN.
JENS PETER PETERSEN.